(12) United States Patent
Kaku et al.

(10) Patent No.: US 11,178,075 B2
(45) Date of Patent: Nov. 16, 2021

(54) RELAY DEVICE

(71) Applicant: DENSO CORPORATION, Kariya (JP)

(72) Inventors: Yoshifumi Kaku, Kariya (JP); Zhuomin Zhou, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/855,551

(22) Filed: Apr. 22, 2020

(65) Prior Publication Data

US 2020/0344181 A1 Oct. 29, 2020

(30) Foreign Application Priority Data

Apr. 26, 2019 (JP) .............................. JP2019-086485

(51) Int. Cl.
*H04L 12/935* (2013.01)
*H04L 12/46* (2006.01)
*H04L 12/433* (2006.01)
*G06F 3/06* (2006.01)

(52) U.S. Cl.
CPC .......... *H04L 49/309* (2013.01); *G06F 3/0604* (2013.01); *G06F 3/067* (2013.01); *G06F 3/0656* (2013.01); *H04L 12/433* (2013.01); *H04L 12/4604* (2013.01)

(58) Field of Classification Search
CPC . H04L 49/309; H04L 12/433; H04L 12/4604; G06F 3/0604; G06F 3/0656; G06F 3/067
See application file for complete search history.

(56) References Cited

U.S. PATENT DOCUMENTS

| 6,400,715 B1 | 6/2002 | Beaudoin et al. |
| 2006/0215645 A1 | 9/2006 | Kangyu |
| 2007/0147835 A1* | 6/2007 | Kim ...................... H04J 14/00 |

FOREIGN PATENT DOCUMENTS

JP           H09-083576 A           3/1997

* cited by examiner

*Primary Examiner* — Ronald B Abelson
(74) *Attorney, Agent, or Firm* — Posz Law Group, PLC

(57) ABSTRACT

A replay device includes: multiple transceiver units that transmits and receives a communication frame, each transceiver unit including a register in which at least data indicating a set-up content relating to an operation of a respective transceiver unit is written; a register access unit that is connected with each transceiver unit through an interface; and a control unit that transmits a control message to the register access unit. The control message includes access target information for designating one or more access target transceiver units, and access content information indicating an access content to a register of each access target transceiver unit. The register access unit sets the one or more target transceiver units designated by the access target information, and perform an access to the register of each access target transceiver unit according to the access content.

5 Claims, 4 Drawing Sheets

START
↓
RECEIVE CONTROL MESSAGE FROM CONTROL UNIT — S110
↓
CREATE CONTROL MESSAGE (ACCESS MESSAGE) TO ACCESS TARGET PHY — S120
↓
TRANSMIT ACCESS MESSAGE TO ACCESS TARGET PHY — S130
↓
END

| BIT POSITION | PHYNo | PHYID |
|---|---|---|
| FIRST BIT | 1 | 0000 |
| SECOND BIT | 2 | 0001 |
| THIRD BIT | 3 | 0010 |
| ⋮ | ⋮ | ⋮ |
| 16TH BIT | 16 | 1111 |

RELAY DEVICE

CROSS REFERENCE TO RELATED APPLICATION

The present application claims the benefit of priority from Japanese Patent Application No. 2019-086485 filed on Apr. 26, 2019. The entire disclosure of the above application is incorporated herein by reference.

TECHNICAL FIELD

The present disclosure relates to a relay device.

BACKGROUND

For example, as a conceivable device, an Ethernet switch has multiple ports as a relay device in a network. Ethernet is a registered trademark. A port in the Ethernet switch is also referred to as a PHY. The PHY is an abbreviation for "physical layer". The PHY corresponds to a transceiver unit that transmits and receives a communication frame.

SUMMARY

According to an example embodiment, a replay device includes: multiple transceiver units that transmits and receives a communication frame, each transceiver unit including a register in which at least data indicating a set-up content relating to an operation of a respective transceiver unit is written; a register access unit that is connected with each transceiver unit through an interface; and a control unit that transmits a control message to the register access unit. The control message includes access target information for designating one or more access target transceiver units, and access content information indicating an access content to a register of each access target transceiver unit. The register access unit sets the one or more target transceiver units designated by the access target information, and perform an access to the register of each access target transceiver unit according to the access content.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
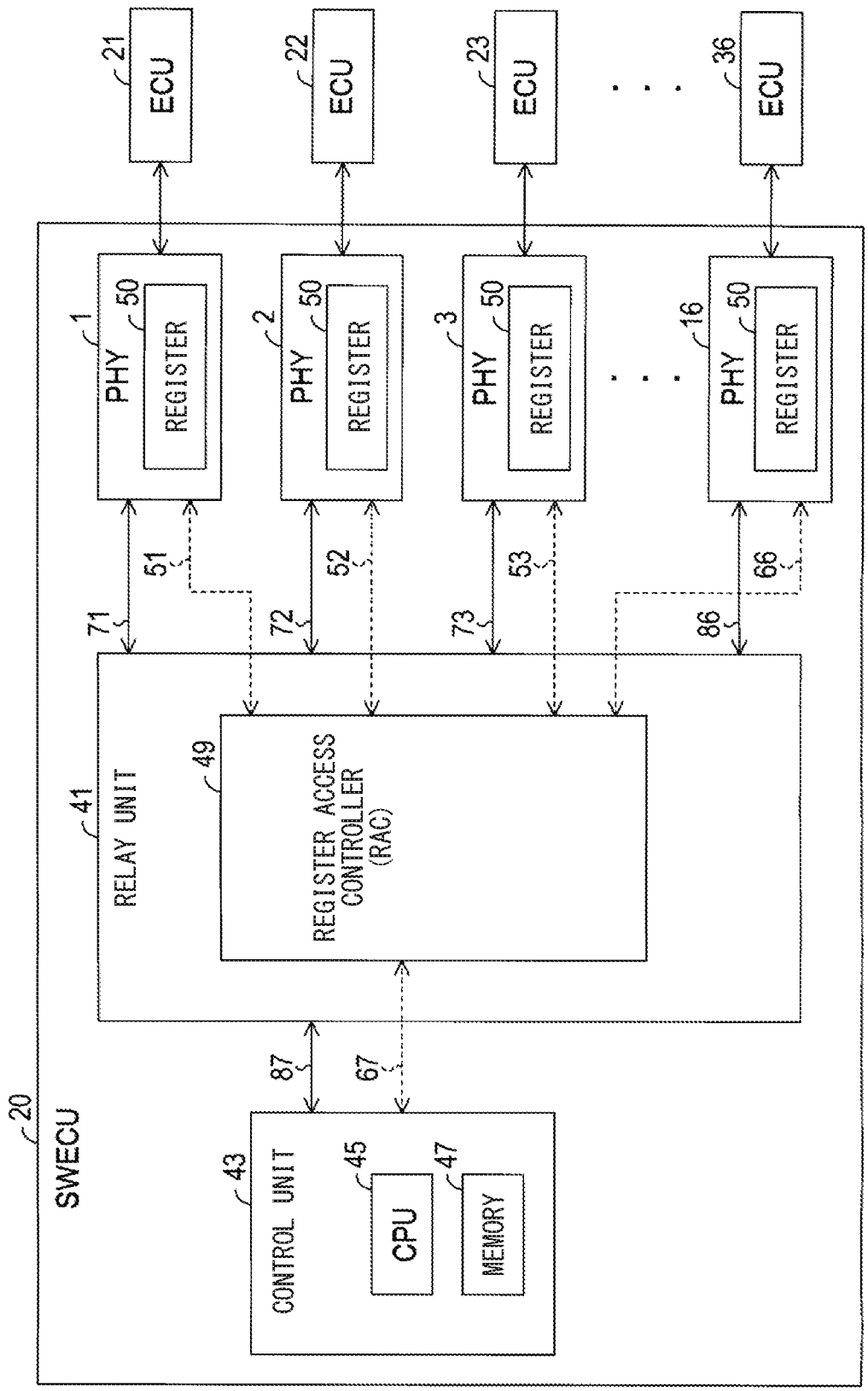
FIG. 1 is a block diagram showing a configuration of an SWECU as a relay device according to a first embodiment.

As a result of detailed examination by the inventors, the following difficulties with respect to the relay device have been found.

For example, in the Ethernet switch, multiple PHYs include a register in which at least data indicating a setting content relating to the operation of the PHY (that is, setting data) is written. A control message is transmitted to each of the PHYs, which is output from a control unit such as a microcomputer for initial setting at the time of activating a communication system, and which is used to access a register of the PHY.

However, in a conceivable Ethernet switch, even if the access contents to the registers of the multiple PHYs are the same, the control message must be sequentially transmitted from the control unit to each of the PHYs. This increases a time required to access the registers of the PHYs. This leads to, for example, a longer time required for activating the communication system.

Therefore, according to an example embodiment, the time required to access the registers of the multiple transceiver units is reduced.

A relay device according to an example embodiment includes multiple transceiver units that transmits and receives communication frames, a register access unit, and a control unit. Each of the multiple transceiver units includes a register in which at least data indicating a setting content relating to the operation of the transceiver units is written.

Each of the multiple transceiver units is connected to the register access unit through an interface for each of the multiple transceiver units.

The control unit transmits, to the register access unit, a control message including access target information that can designate multiple access target transceiver units, which are any of the multiple transceiver units, and access content information indicating the content of access to the register of the access target transceiver unit.

The register access unit sets one or more transceiver units designated by the access target information included in the control message among the multiple transceiver units, as an access target. Then, the register access unit performs an access according to the content indicated by the access content information included in the control message as an access to the register of the access target transceiver unit.

According to the configuration described above, one control message is transmitted from the control unit to the register access unit, thereby being capable of performing an access to the registers of the multiple transceiver units. Then, the register access unit can access the multiple transceiver units by the interface for each of the multiple transceiver units at the same time. Therefore, the time required for accessing the registers of the multiple transceiver units can be reduced. Further, in the case of accessing the registers of the multiple transceiver units, a processing load of the control unit is reduced.

Embodiments of the present disclosure will be described below with reference to the drawings.

1. First Embodiment

[1-1. Configuration]

An ECU 20 according to a first embodiment shown in FIG. 1 is an ECU as a relay device that relays communication frames between multiple ECU 21 to 36 connected to the ECU 20. The ECU is an abbreviation for "Electronic Control Unit". The ECU as the relay device is referred to as SWECU in order to distinguish the ECU from the other ECUs 21 to 36. The SWECU 20 functions as an Ethernet relay device (that is, an Ethernet switch).

The SWECU 20 includes multiple transceiver units (hereinafter, referred to as PHYs) 1 to 16 that transmits and receives communication frames (that is, Ethernet frames) to be relayed. The ECUs 21 to 36 serving as communication nodes are connected to respective PHYs 1 to 16 through communication lines. The number of ECUs and the number of PHYs connected to the SWECU 20 are 16 in the present embodiment, but may be other than 16. At least one of the ECU 21 to 36 connected to the SWECU 20 may be another SWECU.

The SWECU 20 further includes a relay unit 41 and a control unit 43.

The relay unit 41 and the PHYs 1 to 16 are connected to each other through interfaces 71 to 86 corresponding to the respective PHYs 1 to 16. The interfaces 71 to 86 are interfaces for input and output of the communication frames, and are, for example, Mils (that is, Media Independent Interfaces).

The relay unit 41 performs, for example, a switching process (that is, a relay process) using a VLAN defined in a MAC address or the IEEE802.1Q, thereby transmitting a communication frame received by any one of the PHYs 1 to 16 from any one of the other PHYs 1 to 16.

The control unit 43 is configured by at least one microcomputer including a CPU 45 and a memory 47. The operation of the control unit 43, which will be described later, is realized by causing the CPU 45 to execute a program stored in the memory 47.

Each of the PHYs 1 to 16 includes a register 50.

In the register 50 of each of the PHYs 1 to 16, data indicating the setting content relating to the operation of the PHY (that is, setting data) is written by the control unit 43 through a register access controller 49, which is to be described later. The setting data includes, for example, data indicating in which mode the PHY operates in a master or a slave, data indicating a communication speed of a communication to be performed by the PHY, and the like. In the register 50 of each of the PHYs 1 to 16, data of predetermined information relating to the communication detected in the PHY is written. The predetermined information includes, for example, a noise level (that is, SNR) at the time of communication, a link state, and the like. The data written in the register 50 can be read by the control unit 43 through a register access controller 49, which will be described later.

The relay unit 41 is provided with the register access controller (hereinafter, referred to as RACs) 49 for performing an access to the PHYs 1 to 16 in accordance with a control message from the control unit 43. The access to the PHYs 1 to 16 is, in detail, the access to the registers 50 of the PHYs 1 to 16.

The RAC 49 and the PHYs 1 to 16 are connected to each other through the interfaces 51 to 66 for the respective PHYs 1 to 16. The interfaces 51 to 66 are interfaces for accessing the register 50, and are, for example, MDIs (that is, Management Data Interface). The MDI is a two-wire serial interface with an MDIO (that is, Medium Dependent Input/Output) and an MDC (that is, Management Data Clock). The RAC 49 can simultaneously access the registers 50 of the multiple PHYs 1 to 16 through the respective interfaces 51 to 66.

The RAC 49 and the control unit 43 are connected to each other through an interface 67. The interface 67 is an interface for accessing the registers 50 of the PHYs 1 to 16. The above control message from the control unit 43 to the RAC 49 is transmitted through the interface 67. The interface 67 may be, for example, the MDI described above.

The relay unit 41 and the control unit 43 are connected to each other through an interface 87 for input/output of a communication frame. The interface 87 may be, for example, the MII described above.

[1-2. Description of Control Message]

Figure 2:
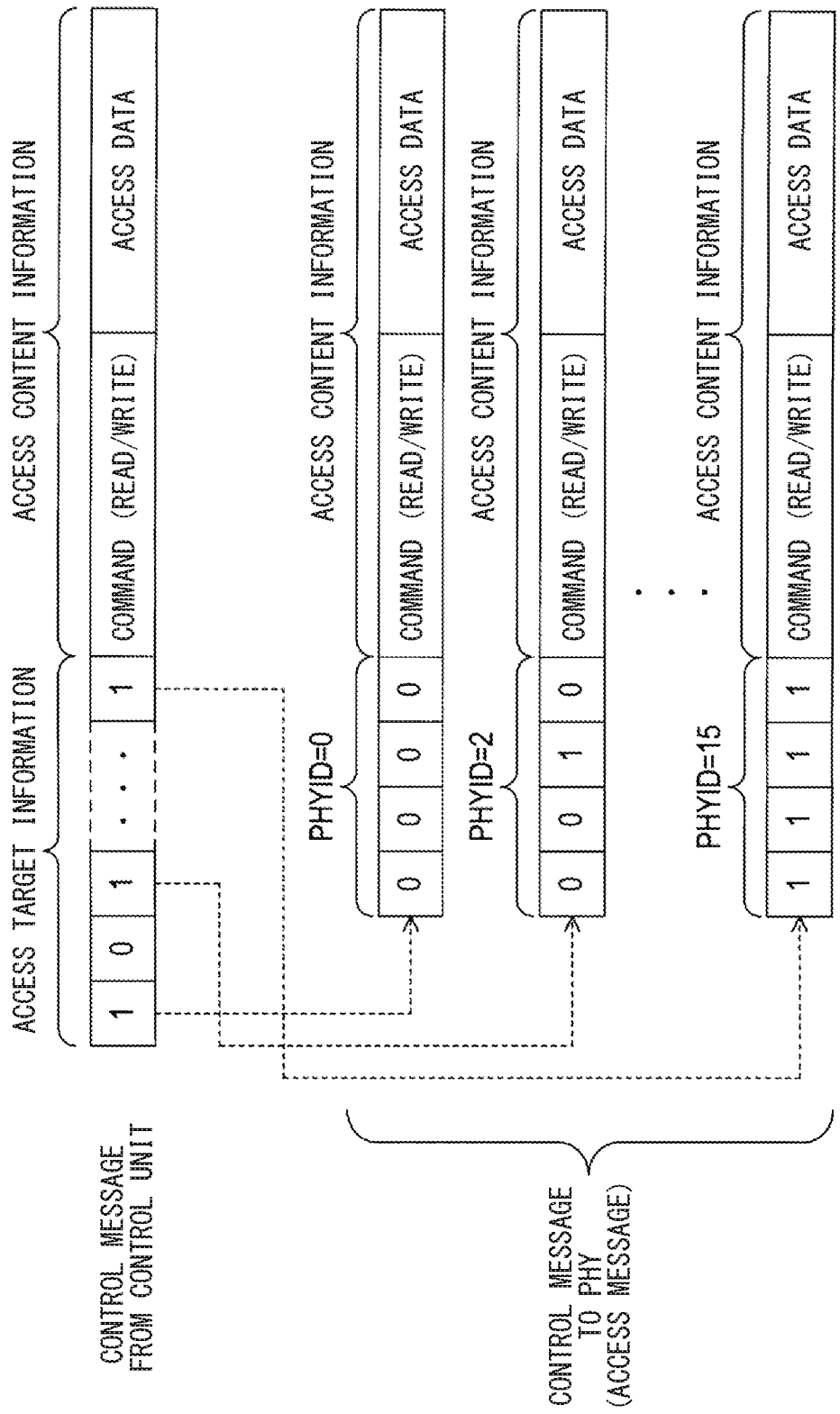
FIG. 2 is an illustrative diagram illustrating a control message from a control unit and an access message to a PHY.

When the PHYs 1 to 16 are accessed by the RAC 49, control messages as shown in second and subsequent stages in FIG. 2 are transmitted from the RAC 49 through the interfaces 51 to 66.

As shown in the second and subsequent stages of FIG. 2, the control messages from the RAC 49 to the PHYs 1 to 16 (hereinafter, referred to as access messages) each include a PHY ID and access content information.

The PHY ID is an ID uniquely determined for each of the PHYs 1 to 16, and corresponds to an address of the PHY and also corresponds to identification information of the PHY.

In the present embodiment, the PHY ID is 4-bit data. For that reason, data values of the PHY ID are 16 data values from "0" to "15". Numbers are expressed in decimal numbers unless otherwise noted. The PHY ID of data values obtained by subtracting 1 from 1 from the PHY codes 1 to 16 of the PHY is associated with the respective PHYs 1 to 16. For example, the PHY ID of the PHY 1 is "0" and the PHY ID of the PHY 16 is "15".

The access content information is information indicating the content of access to the register 50.

Specifically, the access content information includes a command as access type information indicating whether the access is write or read, and data relating to the access (hereinafter, referred to as access data). When the command is a write command, that is, when the access message is for a write access, the access data is configured to include write target data and a write destination address in the register 50. When the command is the read command, that is, when the access message is for the read access, the access data is configured to include a read destination address in the register 50.

Then, when an access message including the PHY ID of the PHY is transmitted from the RAC 49, the PHYs 1 to 16 receive and acquire the access message. Then, an access handling process for realizing an access based on the access content information included in the acquired access message is performed. A specific content of the access handling process are as follows.

The PHYs 1 to 16 determines commands in the access content information in the acquired access messages. When the command is the write command, the write target data and the write destination address are acquired from the access data in the access content information, and the write target data is written to the write destination address in the register 50. When the command in the access content information is the read command, the PHYs 1 to 16 each acquire the read destination address from the access data in the access content information. In this case, the access data may be acquired as the read destination address. Then, the PHYs 1 to 16 read data from the read destination addresses in the register 50, and transmits the read data to the RAC 49 through the interfaces 51 to 66. The data transmitted from the PHYs 1 to 16 to the RAC 49, that is, the data read from the register 50, is transmitted from the RAC 49 to the control unit 43 through the interface 67.

Therefore, the RAC 49 transmits an access message including the PHY ID of the PHY and the access content information to the access target PHY, thereby making it possible to perform an access according to the content indicated by the access content information as an access to the register 50 of the access target PHY.

On the other hand, a control message as shown in a first stage in FIG. 2 is transmitted from the control unit 43 to the RAC 49 as a control message for performing an accesses to the PHYs 1 to 16.

As shown in the first stage in FIG. 2, the control message from the control unit 43 to the RAC 49 includes the access target information that can designate the multiple access target PHYs, which are any one of the PHYs 1 to 16, and the access content information described above.

The access target information includes 16 bits that are uniquely associated with each of the PHYs 1 to 16.

In the present embodiment, each bit in the access target information is associated with each of the PHYs 1 to 16 in order from the first bit. For example, a first bit corresponds to the PHY 1 and a 16th bit corresponds to the PHY 16. The first bit referred to in the present specification is the most significant bit, but the least significant bit may be the first bit. A correspondence relationship between each of the bits and each of the PHYs 1 to 16 in the access target information may be any correspondence relationship as long as the correspondence relationship is unique.

Further, each bit in the access target information indicates that the PHY corresponding to the bit in question is the access target, for example, when the value is "1", and indicates that the PHY corresponding to the bit in question is not the access target, for example, when the value is "0". Therefore, the access target information in the control message exemplified in the first row of FIG. 2 indicates that at least the PHYs 1, 3, and 16 are the access target, and at least the PHY 2 is not the access target.

In other words, each bit in the access target information corresponds to command information indicating whether or not the corresponding PHY is the access target.

The number of bits of the access target information may be larger than the number of PHYs 1 to 16. In this instance, for example, each of the multiple bits in the access target information may indicate whether or not the corresponding PHY in question is the access target, in correspondence with each of the PHYs 1 to 16.

[1-3. Processing]

Next, the process performed by the RAC 49 will be described with reference to a flowchart of FIG. 3.

Figures 3, 4:
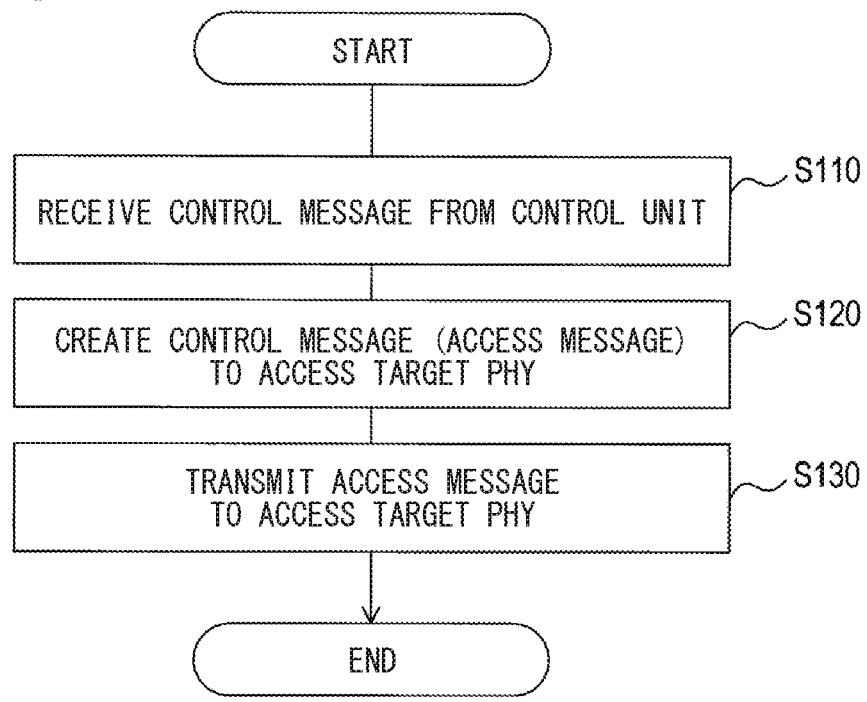
FIG. 3 is a flowchart of processing performed by a register access controller according to the first embodiment.
FIG. 4 is an illustrative diagram illustrating an ID table.

The RAC 49 describes the process of FIG. 3 when the control message described above is transmitted from the control unit 43.

As shown in FIG. 3, the RAC 49 first receives the control message from the control unit 43 in S110.

Then, the RAC 49 identifies the access target PHY based on the control message received in S110 and an ID table 90 shown in FIG. 4, and creates a control message (that is, an access message) to be transmitted to the access target identified PHY in S120.

Specifically, the RAC 49 includes a memory in which at least the ID table 90 shown in FIG. 4 is stored.

In the ID table 90, the bit positions in the access target information in the control messages from the control unit 43, and the numbers (that is, PHY No) and the PHY IDs of the PHYs 1 to 16 corresponding to the respective bit positions are recorded in association with each other. In the present embodiment, the PHY No is the same number as the PHY code (that is, 1 to 16).

Then, the RAC 49 identifies the bit position of the bit whose value is "1" in the access target information in the control message received from the control unit 43, and identifies the PHY of the PHY No recorded in the ID table 90 in association with the identified bit position as the access target PHY. Further, the RAC 49 acquires the PHY ID of the access target PHY from the ID table 90. Then, the RAC 49 creates an access message to be transmitted to the access target PHY by replacing the access target information in the control message from the control unit 43 with the PHY ID of the access target PHY.

When there are multiple bits whose values are "1" in the access target information, the multiple PHYs are accessed by the RAC 49. Then, an access message for each of the multiple PHYs is created.

For example, as shown in the first stage in FIG. 2, when the values of the first bit, the third bit, and the sixteenth bit in the access target information in the control message from the control unit 43 are "1", the RAC 49 creates an access message as shown in the second stage, the third stage, and the fourth stage in FIG. 2.

The access message shown in the second stage of FIG. 2 is an access message to the PHY 1 whose PHY No is "1", which is an access message in which an access target information in the control message from the control unit 43 is replaced with the PHY ID of the PHY 1 (that is, PHY ID whose data value is "0"). The access message shown in the third stage of FIG. 2 is an access message to the PHY 3 whose PHY No is "3", which is an access message in which an access target information in the control message from the control unit 43 is replaced with the PHY ID of the PHY 3 (that is, PHY ID whose data value is "2"). The access message shown in the fourth stage of FIG. 2 is an access message to the PHY 16 whose PHY No is "16", which is an access message in which an access target information in the control message from the control unit 43 is replaced with the PHY ID of the PHY 16 (that is, PHY ID whose data value is "15").

Then, as shown in FIG. 3, the RAC 49 transmits the access message created in S120 to the access target PHY in S130 subsequent to S120, thereby executing the access to the register 50 of the access target PHY. When there are the multiple access target PHYs, the RAC 49 transmits the access message created for the PHY in question to each access target PHY in S130. Thereafter, the RAC 49 ends the process of FIG. 3.

[1-4. Effects]

According to the first embodiment described in detail above, the following effects are obtained.

(1a) The control message transmitted from the control unit 43 to the RAC 49 includes access target information that can designate the multiple access target PHYs, and access content information indicating the access content to the register 50 of the access target PHY. The RAC 49 sets one or more PHYs designated by the access target information in the control message from the control unit 43 as access targets. The RAC 49 performs the access according to the content indicated by the access content information as an access to the register 50 of the access target PHY.

For that reason, one control message is transmitted from the control unit 43 to the RAC 49, thereby making it possible to implement an access to the registers 50 of the multiple PHYs. The RAC 49 can simultaneously access the PHYs 1 to 16 by the interfaces 51 to 66 for the respective PHYs 1 to 16. Therefore, a time required to access the registers 50 of the multiple PHYs can be reduced. Further, in the case of accessing the registers 50 of the multiple PHYs, the processing load of the control unit 43 is inhibited.

As a configuration of a comparative example, a configuration is conceivable in which the control message from the control unit 43 is transmitted as they are to the PHYs 1 to 16 through the RAC 49. In the configuration described above, the control unit 43 transmits the access messages shown in the second and subsequent stages in FIG. 2 as the control messages for the PHYs 1 to 16. For that reason, even if the access content to the registers 50 of the multiple PHYs are the same, the control unit 43 must sequentially transmit the control messages to the PHYs. This causes a difficulty that the time required to access the registers of the multiple PHYs becomes long. On the other hand, according to the configuration of the above embodiment, the above difficulty can be inhibited.

(1b) The access target information in the control message transmitted from the control unit 43 includes multiple bits associated with each of the PHYs 1 to 16, which are bits as multiple command information indicating whether or not the corresponding access target PHY. The multiple access target PHYs can be easily identified from the access target information described above.

(1c) The RAC 49 is configured to perform an access according to the content indicated by the access content information as an access to the register 50 of the access target PHY by transmitting an access message including the PHY ID of the access target PHY and the access content information to the access target PHY. For that reason, the RAC 49 creates an access message to be transmitted to the access target PHY by replacing the access target information in the control message from the control unit with the PHY ID of the access target PHY. According to the configuration described above, the processing load and the processing time for creating the access message in the RAC 49 can be reduced.

In the above embodiment, the RAC 49 corresponds to a register accessing unit.

2. Second Embodiment

[2-1. Differences from First Embodiment]

Since a basic configuration of a second embodiment is the same as that of the first embodiment, differences will be described below. The same reference numerals as in the first embodiment denote the same components, and reference is made to the preceding description.

Figure 5:
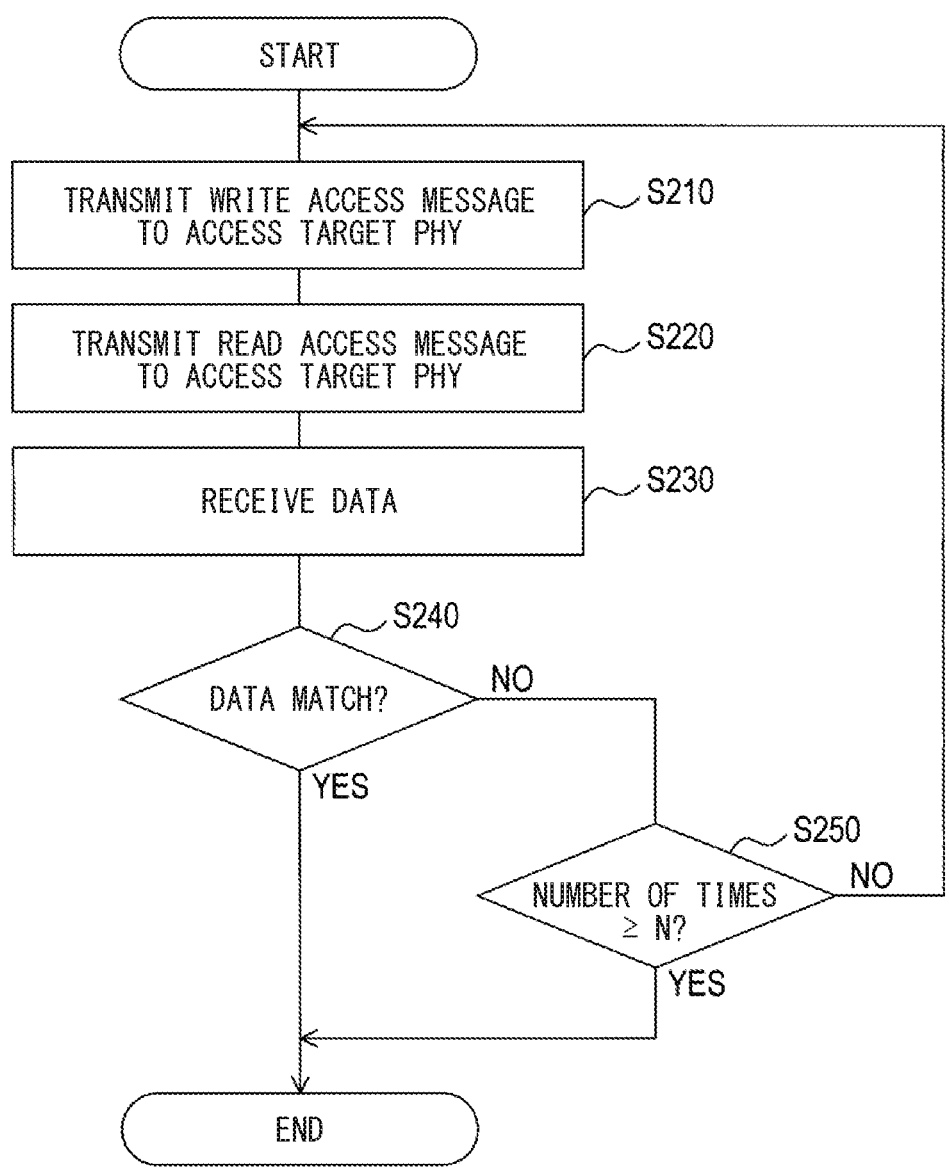
FIG. 5 is a flowchart of processing performed by a register access controller according to a second embodiment.

A RAC 49 performs a process of FIG. 5 when performing a write access to registers 50 of PHYs 1 to 16, that is, when transmitting an access message including a write command to an access target PHY among the PHYs 1 to 16.

Specifically, when a command included in the control message received from a control unit 43 in S110 of FIG. 3 is a write command, a RAC 49 performs a process of FIG. 5 on the access target PHY in S130 of FIG. 3. When there are multiple access target PHYs, the process of FIG. 5 is performed on each of the access target PHYs. In the following description, an access message including a write command among access the access messages is referred to as a write access message. An access message including a read command is referred to as a read access message.

As shown in FIG. 5, the RAC 49 transmits the access message (that is, the write access message) created in S120 of FIG. 3 to the access target PHY in S210.

The RAC 49 transmits a read access message to the access target PHY in the following S220. The read access message transmitted in S220 is a message in which items <a> and <b> to be described below have been changed with respect to the write access message transmitted in S210.

<a> The command is changed from the write command to the read command.

<b> The access data is changed from data including the write target data and the write destination address to data including a read destination address. The read destination address is the same as the write destination address included in the access data in the write access message.

The RAC 49 receives, in S230, data transmitted by the access target PHY in response to the read access message transmitted in S220. The data received in S230 is data read from the register 50 of the access target PHY.

In the following S240, the RAC 49 determines whether or not the data received in S230 matches the write target data included in the write access message transmitted in S210. When it is determined that the data received in S230 matches the write target data, the RAC 49 terminates the process of FIG. 5.

When it is determined in the above S240 that the data received in S230 does not match the write target data, the RAC 49 proceeds to S250.

In S250, the RAC 49 determines whether or not the number of times of returning from S250 to S210, that is, the number of times of transmitting the same write access message to the access target PHYs, is a predetermined value N of two or more (for example, three).

If it is determined in S250 that the number of times is not equal to or greater than the predetermined value N, the RAC 49 returns to S210 and performs the processes of S210 to S240 again. If the RAC 49 determines in S250 that the number of times is equal to or greater than the predetermined value N, the process of FIG. 5 is terminated.

The RAC 49 may notify the control unit 43 that the write access has failed when it is determined in S250 that the number of times is equal to or more than the predetermined value N, or when it is determined in S240 that the data received in S230 and the write target data do not match each other.

[2-2. Effects]

According to the second embodiment described in detail above, the effects of the first embodiment described above are obtained, and the following effects are further obtained.

(2a) When the RAC 49 executes the write access to the register 50 of the access target PHY by the process in S210, the read access for reading the data written by the write access in S210 is implemented on the register 50 in question by the process in S220. Then, in S240, the RAC 49 determines whether or not the data read by the read access in the process of S220 matches the data written by the write access in the process of S210. According to the configuration described above, it can be confirmed whether or not the write access has been performed correctly.

(2b) When it is determined in S240 that the data read by the read access does not match the data written by the write access, the RAC 49 returns to S210, thereby again performing the same write access as the previous write access on the register 50 of the access target PHY. For that reason, reliable completion of the write access is easily realized 3. Other Embodiments Although the embodiments of the present disclosure have been described above, the present disclosure is not limited to the embodiments described above, and various modifications can be made to implement the present disclosure.

For example, the access configuration to the PHYs 1 to 16 by the RAC 49 is not limited to the configuration of transmitting the access message described above, but may be configurations to be described below.

It is assumed that each interface between the RAC 49 and each of the PHYs 1 to 16 is an interface including a data line, an address line for designating an address in the register 50, and an access type line indicating the type of access (that is, read or write).

In this instance, if the command in the access content information in the control messages from the control unit 43 is a write command, the RAC 49 may perform the write access on the access target PHY by the access type line, the data line, and the address line. More specifically, the RAC 49 may designate the write by the access type line, and may perform the write access by outputting the write destination address and the write target data included in the access content information of the control messages to the address line and the data line, respectively.

Similarly, if the command in the access content information in the control message from the control unit 43 is a read command, the RAC 49 may perform the read access on the access target PHY by the access type line, the data line, and the address line. More specifically, the RAC 49 may perform the read access by designating a read by the access type line, outputting the read destination address included in the access content information of the control message to the address line, and acquiring data of the read destination address in the register 50 from the data line.

Further, for example, the RAC 49 may be provided separately from the relay unit 41.

The control unit 43, the RAC 49, and the technique of those components in the SWECU 20 described in the present disclosure may be implemented by a dedicated computer provided by configuring a processor and a memory programmed to execute one or more functions embodied by a computer program. Alternatively, the control unit 43, the RAC 49, and the technique of those components in the SWECU 20 described in the present disclosure may be implemented by a dedicated computer provided by configuring a processor with one or more dedicated hardware logic circuits. Alternatively, the control unit 43, the RAC 49, and the technique of those components in the SWECU 20 described in the present disclosure may be implemented by one or more dedicated computers configured by combination of a processor and a memory programmed to execute one or more functions with a processor including one or more hardware logic circuits. The computer program may also be stored on a computer readable non-transitory tangible recording medium as instructions to be executed by a computer. The technique for realizing the functions of the respective units included in the SWECU 20 does not necessarily need to include software, and all of the functions may be realized by use of one or more hardware.

In addition, the multiple functions of one component in the above embodiment may be realized by multiple components, or a function of one component may be realized by multiple components. In addition, multiple functions of multiple components may be realized by one component, or a function realized by the multiple components may be realized by one component. In addition, a part of the configuration of the above embodiment may be omitted. Also, at least a part of the configuration in the above embodiments may be added to or replaced with another configuration in the above embodiments.

In addition to the SWECU 20 described above, the present disclosure can be realized in various configurations such as a system having the SWECU 20 as a component, a program for causing a computer to function as the SWECU 20, a non-transitory tangible recording medium such as a semiconductor memory in which the program is recorded, and a register control method of the transceiver unit in a relay device.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S210. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device comprising:
a plurality of transceiver units that transmits and receives a communication frame, each of the plurality of transceiver units including a register in which at least data indicating a set-up content relating to an operation of a respective transceiver unit is written;
a register access unit that is connected with each of the plurality of transceiver units through an interface for each of the plurality of transceiver units; and
a control unit that transmits a control message to the register access unit, wherein:
the control message includes access target information for designating one or more access target transceiver units as an access target among the plurality of transceiver units, and access content information indicating an access content to a register of each of the one or more access target transceiver units; and
the register access unit sets the one or more target transceiver units designated by the access target information included in the control message among the plurality of transceiver units as the access target, and perform an access to the register of each of the one or more access target transceiver units according to the access content indicated by the access content information included in the control message.

2. The relay device according to claim 1, wherein:
the access target information includes a plurality of command information items associated with the plurality of transceiver units, respectively; and
each of the plurality of command information items indicates whether a respective transceiver unit is the access target.

3. The relay device according to claim 1, wherein:
the register access unit transmits an access message to the one or more access target transceiver units, in order to perform the access to the register of each of the one or more access target transceiver units according to the access content indicated by the access content information included in the control message;

the access message includes identification information of the transceiver units and the access content information;

the register access unit generates the access message to be transmitted to the one or more access target transceiver units by replacing the access target information in the control message transmitted from the control unit with the identification information of the one or more access target transceiver units.

4. The relay device according to claim 1, wherein:

when performing a write access on the register of each of the one or more access target transceiver units, the register access unit performs a read access on the register to read out data written by the write access; and the register access unit determines whether the data read out by the read access matches the data written by the write access.

5. The relay device according to claim 4, wherein:

when determining that the data read out by the read access does not match the data written by the write access, the register access unit performs a same write access to the register as a previous write access once again.

\* \* \* \* \*